(12) United States Patent
Wobben

(10) Patent No.: US 7,072,784 B2
(45) Date of Patent: Jul. 4, 2006

(54) SYSTEM FOR MONITORING WIND POWER PLANTS

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 165 days.

(21) Appl. No.: 10/884,482

(22) Filed: Jul. 2, 2004

(65) Prior Publication Data

US 2004/0236538 A1 Nov. 25, 2004

Related U.S. Application Data

(62) Division of application No. 10/089,774, filed as application No. PCT/EP00/06433 on Jul. 7, 2000, now Pat. No. 6,785,637.

(30) Foreign Application Priority Data

Oct. 6, 1999 (DE) .............................. 199 48 194

(51) Int. Cl.
*G01H 1/00* (2006.01)
(52) U.S. Cl. .......................... 702/76; 702/188; 416/31; 73/587
(58) Field of Classification Search .................... None
See application file for complete search history.

(56) References Cited

U.S. PATENT DOCUMENTS

| | | | |
|---|---|---|---|
| 4,198,866 A | | 4/1980 | Birjukov et al. |
| 4,904,996 A | * | 2/1990 | Fernandes ............. 340/870.07 |
| 4,967,550 A | * | 11/1990 | Acton et al. .................. 60/794 |
| 5,005,353 A | * | 4/1991 | Acton et al. ............. 60/39.281 |
| 5,082,421 A | * | 1/1992 | Acton et al. ................ 415/118 |
| 5,141,391 A | * | 8/1992 | Acton et al. ................ 415/119 |
| 5,845,230 A | | 12/1998 | Lamberson |
| 6,014,896 A | * | 1/2000 | Schoess ........................ 73/583 |
| 6,076,405 A | * | 6/2000 | Schoess ........................ 73/587 |
| 6,076,776 A | * | 6/2000 | Breitbach et al. ........... 244/219 |
| 6,192,759 B1 | * | 2/2001 | Schoess ........................ 73/583 |
| 6,231,306 B1 | * | 5/2001 | Khalid .......................... 416/26 |
| 6,278,197 B1 | * | 8/2001 | Appa ........................... 290/55 |
| 6,398,502 B1 | * | 6/2002 | Wobben ..................... 416/228 |

FOREIGN PATENT DOCUMENTS

DE 31 12 122 C2 10/1989

(Continued)

OTHER PUBLICATIONS

VDI Berichte Nr. 1515 (1999) (including English translation).

(Continued)

*Primary Examiner*—Carol S. W. Tsai
(74) *Attorney, Agent, or Firm*—Neil A. Steinberg

(57) ABSTRACT

A system to acoustically monitor at least one wind power installation, wherein the wind power installation includes a plurality of components including at least rotor blades. The system may comprise a remote monitoring center and a first wind power installation. The first wind power installation includes a sound pick-up device to detect an operating acoustic spectrum generated by at least one of the components of the first wind power installation during operation thereof, and circuitry to detect when a deviation between the operating acoustic spectrum of the first wind power installation and a reference spectrum exceeds a threshold. The system, in one aspect, may further include communications circuitry to communicate a fault message to the remote monitoring center when the deviation exceeds a threshold. The system may also include a remote monitoring center to monitor the operation of the first wind power installation.

28 Claims, 3 Drawing Sheets

FOREIGN PATENT DOCUMENTS

| | | |
|---|---|---|
| DE | 39 41 290 A1 | 6/1991 |
| DE | 296 09 242 U1 | 9/1996 |
| DE | 195 34 404 A1 | 3/1997 |
| DE | 195 45 008 A1 | 6/1997 |
| DE | 197 45 007 A1 | 4/1998 |
| DE | 197 31 918 A1 | 1/1999 |
| DE | 198 52 229 A1 | 6/2000 |
| EP | 684483 A2 * | 11/1995 |
| JP | 5-20884 | 1/1993 |
| JP | 7-209035 | 8/1995 |
| JP | 11-83618 | 3/1999 |
| WO | WO 84/03702 | 12/1981 |

OTHER PUBLICATIONS

FLENDER ESAT, ESAT Application Reports.

"Wälzlagerdiagnostik für Maschinen und Anlagen" von Sturm, Förster, Hippmann, Kinsky; VEB verlag Technik, Berlin 1985, Seiten 57, 58, 78 bis 80, 133 bis 137, 150 bis 153.

"Allianz-Handbuch der Schadenverhütung". VDI-Verlag, 1984, 3. Auflage; ISBN: 3-18-419089-7, Seiten 34, 35, 49.

"Studie Diagnosesysteme" von dr. Elimer, Heft 412 der FVA, Forschungsvorhaben Nr. 242, Drucklegung Dec. 14, 1993, Seiten 3, 5 und 7.

* cited by examiner

SYSTEM FOR MONITORING WIND POWER PLANTS

RELATED APPLICATIONS

This application is a divisional application of application Ser. No. 10/089,774 filed Jun. 18, 2002, now U.S. Pat. No. 6,785,637 which is the National Stage of International Application No. PCT/EP00/06433, filed Jul. 7, 2000, both of which claim priority to German Patent Application No. 199 48 194.6, filed on Oct. 6, 1999, the contents of which are incorporated herein by reference.

BACKGROUND OF THE INVENTION

The invention concerns a system and method of monitoring wind power installations, wherein in particular acoustic monitoring is effected.

For effective use of wind power installations, it is advantageous for regulation and operational management of a wind power installation to be carried out in such a way as to ensure fully automatic operation of the installation. Any other mode of operation which requires manual intervention in the normal operating procedure is unacceptable for economic considerations. In order to further increase the economy of the installation, regulation should be effected in such a way that the degree of energy conversion achieved in each operating condition is as high as possible. A further important aspect in terms of regulation and operational management of a wind power installation is operational safety. Technical faults and environmentally induced danger conditions must be recognised and the safety systems present triggered. In addition a regulating system can contribute to reducing the mechanical loading on the wind power installation.

In terms of monitoring wind power installations it is also desirable if remote analysis can be carried out. That has the advantage that detection of respective operating data can be implemented centrally. Remote monitoring of that kind can lead to an increase in the economy of the installation and an increase in the average availability of the installation. In that situation for example the operating data are interrogated and analysed by a service centre or a remote monitoring centre. By means of analysis of the inputted parameters, it is possible on the one hand to afford early recognition of problems occurring, while on the other hand the operating data can provide important indications regarding the production and wind data for the development department. Analysis of such data by the development department can result in improvements to the wind power installation.

In a known wind power installation for example the following parameters are regularly monitored by sensor means: wind speed, wind direction, air density, rotary speed per minute (average and extreme values), temperatures, currents, voltages, switching pulse, lightning strikes (event counters) etc.

Analysis of the inputted parameters by the remote monitoring centre can result in an improvement in the on-site service as the remote monitoring centre can give the on-site service precise indications in regard to the fault sources.

For further improving maintenance, safety and economy of a wind power installation, it is desirable for further parameters of the wind power installation to be monitored.

BRIEF SUMMARY OF THE INVENTION

Therefore, the object of the invention is to improve monitoring of wind power installations.

In accordance with the invention, that object is attained by acoustic monitoring, in addition to the above-described monitoring of a wind power installation.

The advantages achieved with the invention are in particular that it is possible to implement improved early fault detection in order to avoid consequential damage. That for example can result in the recognition of loose screw connections, electrical faults in the generator area, in regard to the inverter, or in regard to the transformer and wear or icing on the rotor blades at an early stage.

In accordance with the invention, for acoustic monitoring of wind power installations, firstly a reference noise spectrum of an installation or parts thereof is recorded and stored. The operating noise spectrum can be continuously or repetitively recorded during operation and compared to the stored reference spectrum and deviations between those two spectra can be detected. Instead of recording a reference noise spectrum of a wind power installation, it is also possible to have recourse to an already stored reference noise spectrum of a wind power installation.

In accordance with an advantageous embodiment of the invention the detected deviations between the operating and reference noise spectra are communicated to a remote monitoring centre in order to undergo central analysis.

Advantageously likewise the original noises which are recorded by a sound pick-up and which have given rise to the deviation between the operating spectrum and the reference spectrum can be communicated to the remote monitoring centre so that the operating personnel at the centre can themselves check the noises by listening thereto.

In that respect it is particularly advantageous to form a noise pattern from the original noises and in turn to build up an acoustic data bank from those noise patterns.

If the deviations between the operating spectrum and the reference spectrum are greater than a predetermined threshold value the wind power installation is possibly switched off.

DETAILED DESCRIPTION OF THE INVENTION

Figure 1:
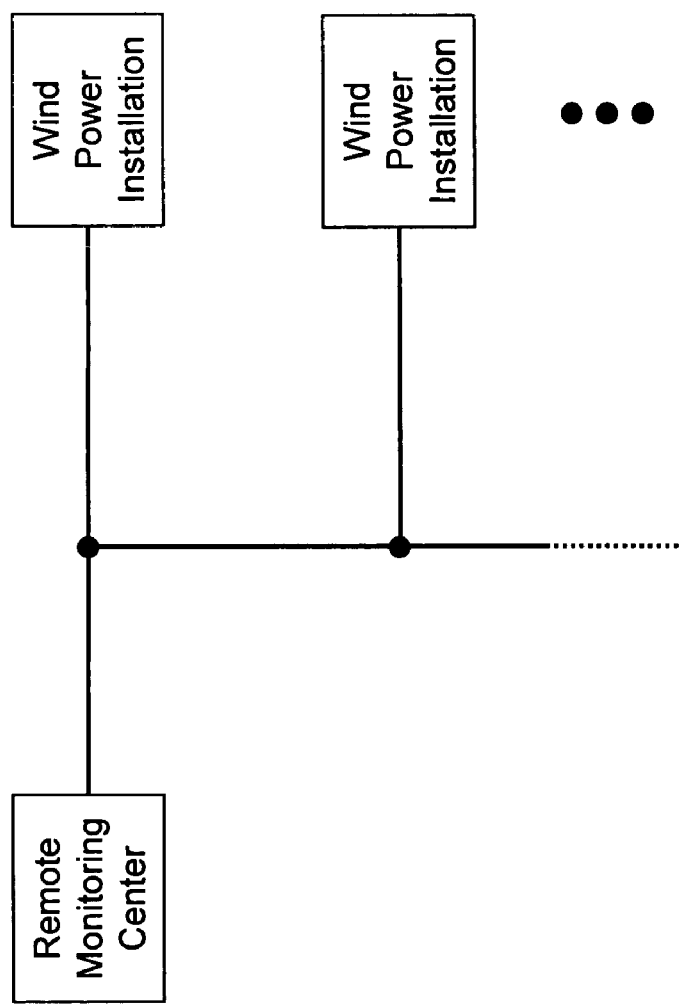
FIG. 1 is an exemplary schematic block diagram of one embodiment of a system of the present invention.
Figure 2:
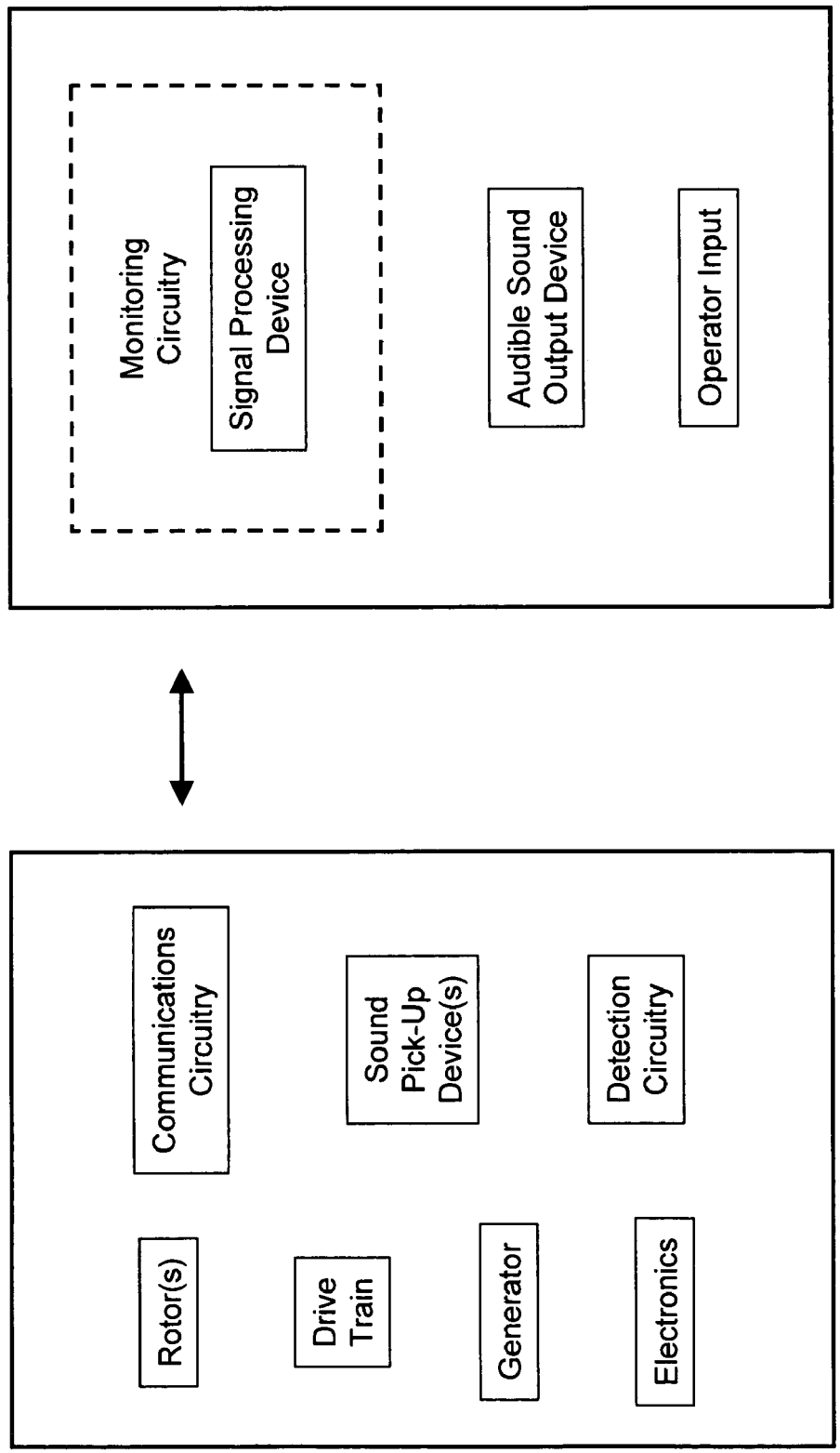
FIGS. 2 and 3 are exemplary schematic block diagrams of a wind power installation and a remote monitoring center, according to one embodiment of the present invention.
Figure 3:
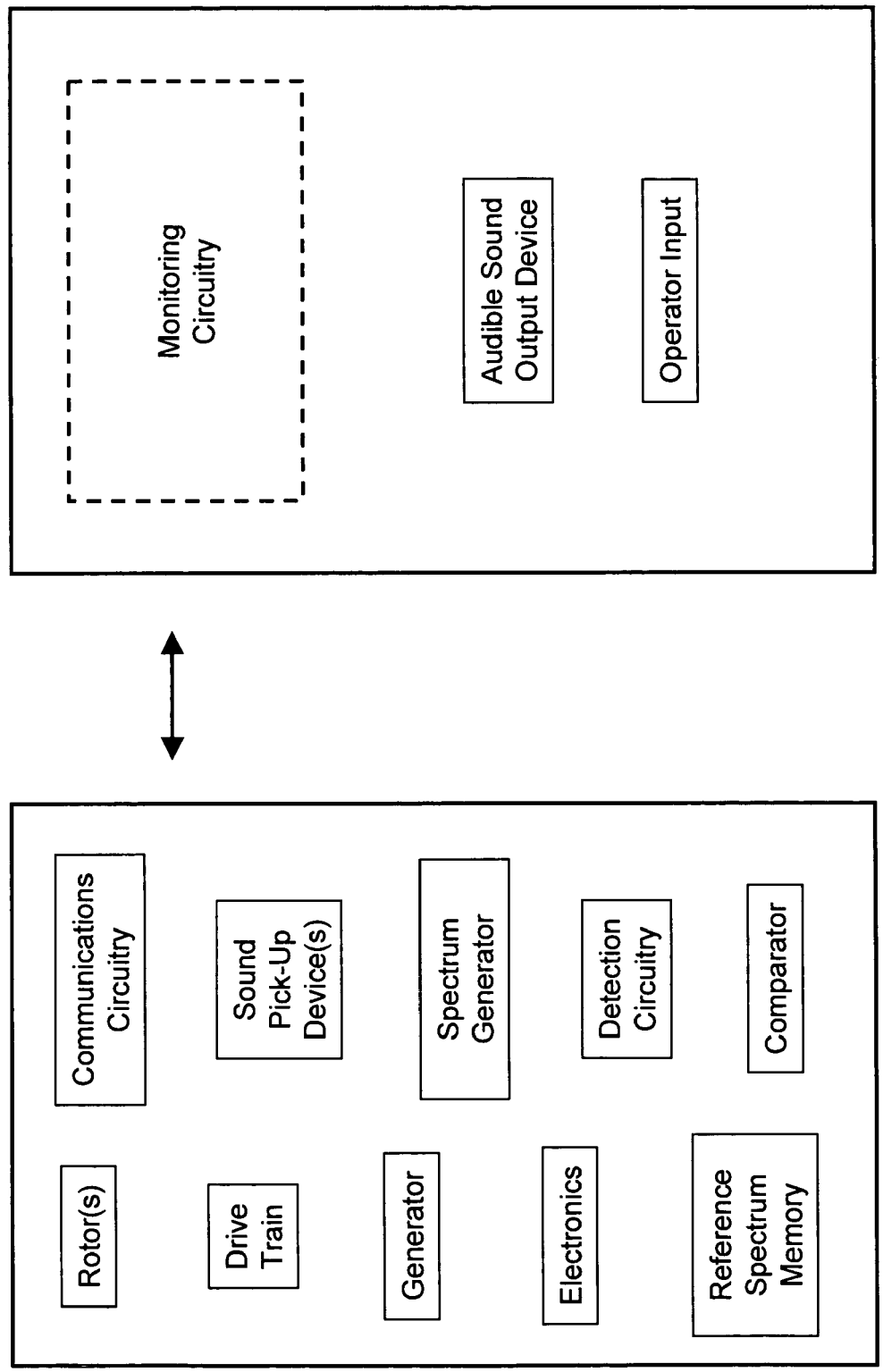

An embodiment of the invention is described hereinafter with reference to FIGS. 1, 2 and 3.

In accordance with the invention, in a trial run with a wind power installation, a respective typical reference noise spectrum or reference noise profile of the wind power installation is recorded for given operating ranges such as for example part-load or rated load, and stored in a data memory. In the case of wind power installations of the same structure, it is also possible to use a reference noise spectrum which has already been stored, instead of recording a specific reference noise spectrum for the installation. A plurality of set-up locations for sound pick-ups in the wind power installation are possible, for recording the noise spectrum. For example, it is possible to monitor the rotor blades, the generator or the drive train and the electronics. For the purposes of monitoring the rotor blades, a sound pick-up is mounted for example externally on the tower, for the purposes of monitoring the generator and the drive train a sound pick-up is mounted in the pod and for monitoring the electronics a sound pick-up is mounted in the tower base or in the transformer station. The positions at which the sound pick-ups are set up should not be altered between recording the reference noise spectrum and recording the operating noise spectrum.

In operation of the wind power installation the respective sound (for example as a frequency spectrum of between 0.1 Hz and 30 KHz) is recorded in dependence on the operating point or working range such as for example from 0 KW to the rated power output. That operating sound is compared to the reference noise spectrum and evaluated.

When the operating noise spectrum is detected, the working range or the operating range of the wind power installation is firstly determined in order to compare the operating noise spectrum of the respective range to the corresponding reference noise spectrum. If in that situation there are deviations which exceed a predetermined threshold value, a fault message is produced, which is signalled to the remote monitoring centre and possibly the wind power installation is shut down automatically or manually (by the centre).

When detecting a deviation between the operating noise spectrum and the reference noise spectrum, which exceeds the threshold value, then a fault message is communicated to the remote monitoring centre, as described above. Accurate analysis of the fault message or the deviations can be implemented in the remote monitoring centre. The operating staff in the remote monitoring centre can possibly react quickly to the fault message and communicate that fault message to the maintenance staff on site. In that way early fault detection can take place in good time and faults of that kind can be quickly dealt with by the maintenance staff. In addition consequential damage can be avoided in that way. The average availability of the installation and thus the economy of the installation can be increased by such an improvement in maintenance and upkeep of the wind power installation.

In order to improve fault diagnosis the original noise which was recorded by a sound pick-up and which caused the deviation between the operating spectrum and the reference spectrum can be communicated to the remote monitoring centre. There the operating staff can listen to the noises in question, in a more sophisticated and subtly differentiated manner, and possibly implement suitable measures. A procedure of that kind is desirable as the human ear reacts more sensitively and more selectively to given noises than a signal processing device.

To relieve the load on the operating staff of the remote monitoring centre, noise patterns can be formed from the original noises (audio signals) and an acoustic data bank can be built up from those patterns. A signal processing device compares the recorded noises of a wind power installation with the stored noise patterns and already implements a pre-selection among the possible fault causes. For example the recorded audio signals can be digitised and converted into noise patterns and then subjected to further digital processing. The operating staff of the remote monitoring centre can thus listen to the noise and in that situation already have at hand possible fault causes suggested by the signal processing device. That procedure can result in an improvement and a relief of load at the workplace for the operating staff of the remote monitoring centre and make the monitoring procedure more efficient.

In addition, it is possible to obtain information about the cause and the variation in respect of time of a fault, by building up a data bank in which all deviations between the operating noise spectrum and the reference noise spectrum are stored in respect of time. In addition the data of that data bank can be compared to data of the other operating parameters such as for example wind speed, temperature, current, voltage and so forth. A correlation in regard to fault development can possibly be found from the comparison of such data. Indications of that kind would be very valuable from the point of view of the development department as that knowledge can be used when developing fresh installations and in the further development of existing installations.

The invention claimed is:

1. A system to acoustically monitor at least one wind power installation, wherein the wind power installation includes a plurality of components including at least rotor blades, the system comprising:
   a remote monitoring center;
   a first wind power installation including:
      a sound pick-up device to detect an operating acoustic spectrum generated by at least one of the components of the first wind power installation during operation thereof;
      circuitry to detect when a deviation between the operating acoustic spectrum of the first wind power installation and a reference spectrum exceeds a threshold; and
      communications circuitry to communicate a fault message to the remote monitoring center when the deviation exceeds a threshold.

2. The system of claim 1 wherein the reference spectrum of the first wind power installation is an acoustic spectrum produced by the at least one component of the first wind power installation during normal operation.

3. The system of claim 1 wherein the reference spectrum of the first wind power installation is an acoustic spectrum that is expected to be generated by the at least one component of the first wind power installation during normal operation.

4. The system of claim 1 wherein, in response to the circuitry of the first wind power installation determining the deviation between the operating acoustic spectrum of the first wind power installation and the reference spectrum of the first wind power installation exceeds the threshold, the operation of the first wind power installation is terminated.

5. The system of claim 1 wherein:
   the communications circuitry of the first wind power installation communicates the audible sounds of the first wind power installation, which caused the deviation between the operating acoustic spectrum of the first wind power installation and the reference spectrum to exceed the threshold, to the remote monitoring center; and
   the remote monitoring center includes a device to permit an operator to listen to the audible sounds of the first wind power installation which caused the deviation between the operating acoustic spectrum and the reference acoustic spectrum to exceed the threshold.

6. The system of claim 5 wherein the remote monitoring center, in response to an input from the operator, terminates the operation of the first wind power installation.

7. The system of claim 1 further including:
a second wind power installation including:
   a sound pick-up device to detect an operating acoustic spectrum generated by at least one component of the second wind power installation during operation thereof;
   circuitry to detect whether a deviation between the operating acoustic spectrum of the second wind power installation and an associated reference spectrum exceeds an associated threshold; and
   communications circuitry to communicate a fault message to the remote monitoring center when the deviation between the operating acoustic spectrum of the second wind power installation and the associated reference spectrum exceeds the associated threshold.

8. A system to acoustically monitor at least one wind power installation, wherein the wind power installation includes a plurality of components including at least a generator, drive train, electronics and rotor blades, the system comprising:
   a remote monitoring center to monitor the operation of at least one wind power installation;
   a first wind power installation including:
      a plurality of sound pick-up devices including:
         a first sound pick-up device to detect an operating acoustic spectrum generated by the rotor blades of the first wind power installation during operation of the first wind power installation, including a first operating acoustic spectrum generated by the rotor blades of the first wind power installation during operation of the first wind power installation at a first output level; and
         a second sound pick-up device to detect an operating acoustic spectrum generated by the drive train of the first wind power installation during operation thereof;
      circuitry to compare the first operating acoustic spectrum of the rotor blades of the first wind power installation to a first reference spectrum and to detect if a deviation between the first operating acoustic spectrum of the rotor blades of the first wind power installation and the first reference spectrum exceeds a first threshold; and
      communications circuitry to communicate a fault message to the remote monitoring center when the deviation between the first operating acoustic spectrum of the rotor blades of the first wind power installation and the first reference spectrum exceeds the first threshold.

9. The system of claim 8 wherein:
the first sound pick-up device detects a second operating acoustic spectrum generated by the rotor blades of the first wind power installation during operation of the first wind power installation at a second output level;
the circuitry compares the second operating acoustic spectrum of the rotor blades to a second reference spectrum to detect if a deviation between the second operating acoustic spectrum of the rotor blades of the first wind power installation and the second reference spectrum exceeds a second threshold; and
the communications circuitry communicates a fault message to the remote monitoring center when the deviation between the second operating acoustic spectrum of the rotor blades of the first wind power installation and the second reference spectrum exceeds the second threshold.

10. The system of claim 8 wherein the first reference spectrum is an acoustic spectrum produced by the rotor blades during normal operation and while the first wind power installation is operating at the first power output level.

11. The system of claim 9 wherein:
the first reference spectrum is an acoustic spectrum produced by the rotor blades during normal operation and while the first wind sower installation is operating at the first power output level; and
the second reference spectrum is an acoustic spectrum produced by the rotor blades during normal operation and while the first wind power installation is operating at the second power output level.

12. The system of claim 8 wherein the first reference spectrum is an acoustic spectrum that is expected to be generated by rotor blades during normal operation and while a wind power installation is operating at the first power output level.

13. The system of claim 9 wherein:
the first reference spectrum is an acoustic spectrum produced that is expected to be generated by rotor blades during normal operation and while a wind power installation is operating at the second power output level; and
the second reference spectrum is an acoustic spectrum that is expected to be generated by rotor blades during normal operation and while a wind power installation is operating at the second power output level.

14. The system of claim 8 wherein:
the communications circuitry of the first wind power installation communicates the audible sounds of the first wind power installation, which caused the deviation between the first operating acoustic spectrum of the first wind power installation and the first reference spectrum to exceed the first threshold, to the remote monitoring center; and
the remote monitoring center includes a device to permit an operator to listen to the audible sounds of the first wind power installation which caused the deviation between the first operating acoustic spectrum and the first reference spectrum to exceed the first threshold.

15. The system of claim 8 wherein when the deviation between the first operating acoustic spectrum and the first reference spectrum exceeds the first threshold, the operation of the wind power installation the operation of the first wind power installation is automatically terminated.

16. The system of claim 8 wherein:
the communications circuitry of the first wind power installation communicates the audible sounds, which caused the deviation between the first operating acoustic spectrum and the first reference spectrum to exceed the first threshold, to the remote monitoring center; and
the remote monitoring center includes a signal processing device to analyze the audible sounds to detect a fault.

17. The system of claim 8 further including a second wind power installation including:
   a plurality of sound pick-up devices including a first sound pick-up device to detect an operating acoustic spectrum generated by the rotor blades of the second wind power installation during operation of the second wind power installation, wherein the first sound pick-up device of the second wind power installation detects a first operating acoustic spectrum generated by the rotor blades of the second wind power installation during operation of the second wind power installation at a first output level;

circuitry to compare the first operating acoustic spectrum of the rotor blades of the second wind power installation to an associated reference spectrum and to detect if a deviation between the first operating acoustic spectrum of the rotor blades of the second wind power installation and the associated reference spectrum exceeds a first threshold; and communications circuitry to communicate a fault message to the remote monitoring center when the deviation between the first operating acoustic spectrum of the rotor blades of the second wind power installation and the associated reference spectrum exceeds the first threshold.

18. The system of claim 17 wherein:

the communications circuitry of the first wind power installation communicates the audible sounds, which caused the deviation between the first operating acoustic spectrum of the first wind power installation and the first reference spectrum to exceed the first threshold, to the remote monitoring center; and the communications circuitry of the second wind power installation communicates the audible sounds, which caused the deviation between the first operating acoustic spectrum of the second wind power installation and the associated reference spectrum to exceed the first threshold, to the remote monitoring center; and the remote monitoring center includes a signal processing device to analyze the audible sounds of the first and second wind power installations to detect one or more faults.

19. The system of claim 18 wherein the remote monitoring center includes a device to permit an operator to listen to the audible sounds.

20. The system of claim 19 wherein the remote monitoring center, in response to an input from the operator, terminates the operation of the first wind power installation.

21. A system to acoustically monitor comprising:

a remote monitoring center to monitor the operation of at least one wind power installation;

at least one wind power installation to generate electrical power in response to wind, wherein the wind power installation includes:

a plurality of components including at least a generator, drive train and rotor blades;

a plurality of sound pick-up devices including:

a first sound pick-up device to detect an operating acoustic spectrum generated by the rotor blades of the wind power installation during operation of the wind power installation;

a second sound pick-up device to detect an operating acoustic spectrum generated by the drive train of the wind power installation during operation thereof; and a third sound pick-up device to detect an operating acoustic spectrum generated by the generator of the wind power installation during operation thereof;

circuitry to compare the operating acoustic spectrums of the rotor blades, drive train and generator of the wind power installation to an associated reference spectrum of the wind power installation and to detect if a deviation between the operating acoustic spectrum of the rotor blades, drive train and generator of the wind power installation and the associated reference spectrum exceeds an associated threshold; and communications circuitry to communicate a fault message to the remote monitoring center when the deviation exceeds the associated threshold.

22. The system of claim 21 wherein a given reference spectrum is an acoustic spectrum produced by an associated component during normal operation.

23. The system of claim 21 wherein a given reference spectrum is an acoustic spectrum that is expected to be generated by an associated component during normal operation.

24. The system of claim 1 wherein:

the sound pick-up device detects a second operating acoustic spectrum generated by at least one component of the first wind power installation during operation of the first wind power installation at a second output level;

the circuitry compares the second operating acoustic spectrum to a second reference spectrum to detect if a deviation between the second operating acoustic spectrum and the second reference spectrum exceeds a second threshold; and the communications circuitry communicates a fault message to the remote monitoring center when the deviation between the second operating acoustic spectrum and the second reference spectrum exceeds the second threshold.

25. The system of claim 24 wherein:

the reference spectrum is an acoustic spectrum produced by the at least one of the components during normal operation and while the first wind power installation is operating at the first power output level; and the second reference spectrum is an acoustic spectrum produced by the at least one of the components during normal operation and while the first wind power installation is operating at the second power output level.

26. The system of claim 24 wherein:

the first reference spectrum is an acoustic spectrum produced that is expected to be generated by the at least one component during normal operation and while a wind power installation is operating at the second power output level; and the second reference spectrum is an acoustic spectrum that is expected to be generated by the at least one component during normal operation and while a wind power installation is operating at the second power output level.

27. The system of claim 1 wherein the first reference spectrum is an acoustic spectrum produced by the at least one component during normal operation and while the first wind power installation is operating at the first power output level.

28. The system of claim 1 wherein the first reference spectrum is an acoustic spectrum that is expected to be generated by the at least one component during normal operation and while a wind power installation is operating at the first power output level.

* * * * *